United States Patent
Rosenthal et al.

(10) Patent No.: US 8,365,806 B2
(45) Date of Patent: Feb. 5, 2013

(54) METHOD AND DEVICE FOR PRODUCING A METAL STRIP BY CONTINUOUS CASTING AND ROLLING

(75) Inventors: Dieter Rosenthal, Niederfischbach (DE); Stephan Krämer, Hilchenbach (DE); Jürgen Seidel, Kreuztal (DE); Frank Benfer, Bad Laasphe (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 95 days.

(21) Appl. No.: 12/086,525

(22) PCT Filed: Dec. 7, 2006

(86) PCT No.: PCT/EP2006/011762
§ 371 (c)(1),
(2), (4) Date: Jun. 13, 2008

(87) PCT Pub. No.: WO2007/073841
PCT Pub. Date: Jul. 5, 2007

(65) Prior Publication Data
US 2010/0212856 A1    Aug. 26, 2010

(30) Foreign Application Priority Data

Dec. 16, 2005 (DE) .......................... 10 2005 060 764
Mar. 6, 2006 (DE) .......................... 10 2006 010 137
Nov. 22, 2006 (DE) .......................... 10 2006 054 932

(51) Int. Cl.
*B22D 11/12* (2006.01)
*B22D 11/126* (2006.01)
*B22D 11/14* (2006.01)
*B22D 27/02* (2006.01)
*B21B 1/46* (2006.01)

(52) U.S. Cl. ........ 164/460; 164/476; 164/493; 164/263; 164/417; 164/507; 164/527.6; 164/527.7

(58) Field of Classification Search .................. 164/476, 164/477, 417, 493, 507, 460, 263; 29/527.6, 29/527.7
See application file for complete search history.

(56) References Cited

U.S. PATENT DOCUMENTS 5,461,770 A * 10/1995 Kimura et al. ............... 29/527.7
5,542,165 A    8/1996 Coassin et al.
5,560,236 A   10/1996 Onda et al.
(Continued)

FOREIGN PATENT DOCUMENTS

DE    195 18 144    11/1995
DE    19518144      11/1995
(Continued)

*Primary Examiner* — Kevin P Kerns
(74) *Attorney, Agent, or Firm* — Lucas & Mercanti, LLP; Klaus P. Stoffel

(57) ABSTRACT

A method and a device for producing a metal strip by continuous casting and rolling, in which a thin slab is initially cast into a casting machine, and is subsequently rolled in at least one rolling train using primary heat from the casting cycle. The cast thin slab is passed between the casting machine and the at least one rolling train and at least one holding oven as well as at least one induction oven. The holding oven and the induction oven are activated or deactivated according to a selected mode of operation, that is, a first mode of operation for the continuous production of the metal strip and a second mode of operation for the discontinuous production of the metal strip.

23 Claims, 6 Drawing Sheets

U.S. PATENT DOCUMENTS

| | | | |
|---|---|---|---|
| 5,634,257 A | 6/1997 | Kajiwara et al. | |
| 6,478,899 B1 * | 11/2002 | Legrand et al. | 148/541 |
| 6,540,011 B2 * | 4/2003 | Donini et al. | 164/476 |
| 7,854,884 B2 | 12/2010 | Schuster et al. | |

FOREIGN PATENT DOCUMENTS

| | | |
|---|---|---|
| DE | 69410562 | 10/1998 |
| DE | 10203711 | 8/2003 |
| DE | 10357363 | 7/2005 |
| EP | 0 266 564 | 5/1988 |
| EP | 0 286 862 | 10/1988 |
| EP | 0 415 987 | 3/1991 |
| EP | 0 610 028 | 8/1994 |
| EP | 0610028 | 8/1994 |
| EP | 0 625 383 | 11/1994 |
| EP | 0625383 | 11/1994 |
| EP | 0 666 122 | 8/1995 |
| EP | 0 771 596 | 5/1997 |
| EP | 0 889 762 | 1/1999 |
| EP | 0 889 762 | 10/1999 |
| FR | 2 646 553 | 7/1991 |
| JP | 06 269808 | 9/1994 |
| JP | 2001172721 | 6/2001 |

* cited by examiner

METHOD AND DEVICE FOR PRODUCING A METAL STRIP BY CONTINUOUS CASTING AND ROLLING

BACKGROUND OF THE INVENTION

The invention concerns a method for producing metal strip by direct strand reduction, in which a thin slab is first cast in a casting machine and then rolled in at least one rolling train with utilization of the primary heat of the casting process. The invention also concerns an installation for producing metal strip by direct strand reduction.

Installations of this type are known as thin slab-thin strip direct strand reduction installations and are referred to as CSP installations.

Continuous rolling from the casting heat has long been known but has not yet found commercial success. The rigid connection of the continuous casting installation and the rolling train and temperature control through the whole installation have proven difficult to control.

EP 0 286 862 A1 and EP 0 771 596 B1 disclose methods and installations for continuous rolling from the casting heat. In these cases, the casting process and the rolling process are directly coupled. The continuous strip is cut with a shear shortly before the coiler.

EP 0 415 987 B2 and EP 0 889 762 B1 disclose similar methods for the continuous production of strip steel with the coupling of casting and rolling installations. To overcome the temperature problems at the relatively low conveyance speed, inductive heating units are provided upstream of and within the rolling train.

An alternative technology to this is the rolling of single slabs and single strips. In the discontinuous rolling of strip, the casting and rolling are disconnected from each other. The casting speed is usually very low, and the rolling speed is at a high level and independent of the casting speed, such that the temperature for the last deformation is above the minimum temperature. Installations of this type, which are also referred to as CSP installations, are described, for example, in EP 0 266 564 B1, in which a high reduction is carried out in the thin slab installation.

EP 0 666 122 A1 describes a similar thin slab installation, in which discontinuous strips are rolled with the use of inductive heating between the first finishing stands.

The advantages of discontinuous rolling are that the casting and rolling speed can be adjusted independently of each other. In thin strip rolling, higher rolling speeds can be adjusted, e.g., flexibly, even when the casting installation operates at a lower speed or the speed is just then being adjusted there.

Both methods, i.e., on the one hand, continuous casting and rolling and, on the other hand, discontinuous casting and rolling, are difficult to combine due to the circumstances described above.

SUMMARY OF THE INVENTION

Therefore, the objective of the invention is to remedy this situation and to create a combined casting and rolling method and an associated installation, with which both continuous and discontinuous operation are possible. Accordingly, the goal is to combine the advantages of both methods in a new installation design.

The solution to the objective of the invention with respect to a method is characterized by the fact that the cast thin slabs pass through both at least one holding furnace and at least one induction furnace between the casting machine and the one or more rolling trains, where the holding furnace and the induction furnace are activated or deactivated and controlled by open-loop or closed-loop control as a function of a selected mode of operation, namely, a first mode of operation of continuous production of the metal strip and a second mode of operation of discontinuous production of the metal strip. The order of the two furnaces, i.e., the holding furnace and the induction furnace, can be chosen as desired.

The rolled metal strip is also preferably heated in at least one additional induction furnace downstream of a first rolling train in the direction of strip conveyance, and the one or more additional induction furnaces are activated or deactivated and controlled by open-loop or closed-loop control as a function of the selected mode of operation.

The selection of the mode of operation can be made as a function of the final thickness of the metal strip to be produced or as a function of the casting speed of the metal strip. It has also been found to be effective if it is provided that the mode of operation is selected as a function of the product of the thickness to be produced and the speed of the metal strip or thin slab.

The mode of operation can also be selected as a function of the material to be processed. This can also be related to the given allowable runout temperature of the strip from the rolling mill.

As an example, the continuous mode of operation can be selected if the product of the cast thickness and the casting speed is greater than 70 mm×6.5 m/min=455,000 mm$^2$/min. Naturally, this value can also fall within a different general range, depending on the material; a value between 300,000 mm$^2$/min and 600,000 mm$^2$/min is preferably used as the criterion for the "switching point" from one mode of operation to the other.

An alternative criterion can be that the continuous mode of operation is selected for final thicknesses of the metal strip of less than 2 mm.

When the mode of operation of discontinuous production of the metal strip is selected, the thin slab is preferably held batchwise in the holding furnace at a desired temperature before being conveyed into the rolling train.

When the mode of operation of continuous production of the metal strip is selected, the thin slab can be brought to a desired temperature in the holding furnace and then heated by the induction furnace to the desired rolling temperature immediately before the rolling operation in the rolling train. In an especially preferred embodiment, it can be provided that the amount of heat introduced into the thin slab by the induction furnace depends on the casting speed.

The continuous mode of operation or discontinuous rolling can be set as a function of the casting speed, so that in each case the required final rolling temperature can be attained.

In order to achieve optimum energy input during the production of the metal strip, a refinement of the invention provides that the loss of heat from the heated metal strip and/or from the thin slab to the environment is hindered by thermal insulating means. These means do not have to be used constantly. Therefore, provision can be made to move at least some of the thermal insulating means into or out of the vicinity of the metal strip as a function of the desired mode of operation of the direct strand reduction installation.

One advantageous refinement provides that the metal strip is descaled in the rolling train in an upstream section of the rolling train with respect to the direction of strip conveyance and is then heated in a section of the rolling train that is farther downstream with respect to the direction of strip conveyance. Of course, this does not exclude the provision of additional descaling units.

The descaling of the metal strip and/or the thin slab by means of a descaling unit and the heating of the metal strip and/or the thin slab by means of an induction furnace preferably take place between two rolling stands. In this regard, the heating can follow the descaling in the direction of strip conveyance or vice versa.

The installation for producing a metal strip by direct strand reduction, which comprises a casting machine, in which a thin slab is first cast, and at least one rolling train, which is located downstream of the casting machine and in which the thin slab is rolled with utilization of the primary heat of the casting process, is characterized, in accordance with the invention, by the fact that at least one holding furnace and at least one induction furnace is installed between the casting machine and the one or more rolling trains.

As will be described in detail later, suitable control of the two furnaces, i.e., the holding furnace and the induction furnace, allows both efficient continuous operation and efficient discontinuous operation of the installation. For this purpose, control means are preferably present with which the holding furnace and/or the induction furnace is activated or deactivated and controlled by open-loop or closed-loop control as a function of the selected mode of operation, namely, a first mode of operation of continuous production of the metal strip and a second mode of operation of discontinuous production of the metal strip.

In the direction of conveyance of the thin slab and the metal strip, a holding furnace can be installed first and then an induction furnace. In addition, a roughing train and a finishing train can be provided, and another induction furnace is installed between the roughing train and the finishing train. Furthermore, at least one additional induction furnace can be installed between two rolling stands of the roughing train and/or the finishing train.

It is advantageous to install a strip shear downstream of the first induction furnace and upstream of the finishing train in the direction of conveyance of the thin slab or metal strip. In addition, as is already established practice, a thin slab shear can be installed downstream of the casting machine and upstream of the holding furnace in the direction of conveyance. A strip shear can be installed downstream of the finishing train in the direction of conveyance.

In accordance with another refinement of the invention, thermal insulating means for hindering the loss of heat from the heated metal strip and/or from the heated thin slab to the environment are present, which are arranged in the vicinity of the metal strip at least some of the time. In this regard, means are preferably present for moving at least some of the thermal insulating means into or out of the vicinity of the metal strip.

However, most of the thermal insulating means are generally installed in a stationary way.

Furthermore, it can be provided that at least one descaling unit is present, which is installed in an upstream section of the rolling train in the direction of strip conveyance.

In an especially preferred embodiment of the invention, a holding furnace, an induction furnace and a soaking furnace are installed in this order upstream of the rolling train in the direction of conveyance of the thin slab or metal strip.

The proposed method is supported by the use of efficient inductive furnaces, which today can be constructed in a relatively space-saving way, and by a suitable plant configuration that allows continuous operation or, optionally, discontinuous rolling.

The advantages of the continuous technology, i.e., continuous operation of the proposed installation, in conjunction with CSP technology consist in the following features:

A short overall length of the installation is realized, which results in low capital expenditures.

Energy savings are possible due to the consistent direct rolling without intermediate cooling and subsequent reheating.

In addition, a lower deformation strength is obtained due to the lower rolling speed.

The possibility is created of producing products that are difficult to roll and, e.g., very thin (ultrathin) strips (strip thickness of about 0.8 mm) in large production amounts.

Special materials (high-strength materials) can be processed.

A combination of wide and thin strips can be processed.

The rolling of strip tail ends and thus roll damage can be avoided or reduced.

The breakdown rate of the installation can be reduced, and strips with height defects* can be avoided.

Specific embodiments of the invention are illustrated in the drawings.

DETAILED DESCRIPTION OF THE INVENTION

Figure 1:
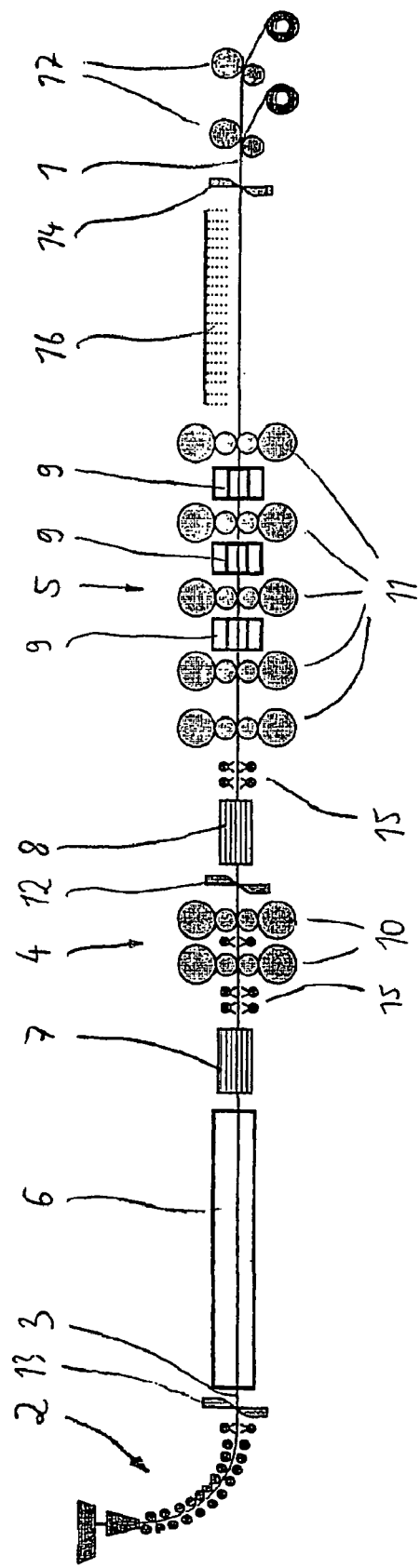
FIG. 1 shows schematically a direct strand reduction installation in accordance with a first embodiment of the invention.

FIG. 1 shows a direct strand reduction installation, in which a metal strip 1 is produced by first casting a thin slab 3 in a casting machine 2 of a type that is already well known and then conveying it to a rolling train 4, 5, which in the present case consists of a roughing train 4 and a finishing train 5.

In order to allow both continuous operation and discontinuous operation in accordance with the above discussion, both a holding furnace 6 and an induction furnace 7 are provided upstream of the rolling train 4, 5. The two furnaces 6, 7 are operated by a suitable control system (not shown) in such a way that the correct strip temperatures are present for the two modes of operation. The open-loop or closed-loop control systems required for this are sufficiently well known from the prior art.

The holding furnace 6 installed downstream of the casting machine 2 can be a conventionally gas-fired furnace. The order in which the holding furnace 6 and induction furnace 7 are arranged can be as desired.

In the embodiment illustrated in FIG. 1, the roughing train 4 has two rolling stands 10, and the finishing train 5 has five rolling stands 11. The drawing also shows that another induction furnace 8 is positioned between the roughing train 4 and the finishing train 5 in order to heat the strip, after it has been roughed in the roughing train 4, to the optimum temperature before finish rolling is carried out in the finishing train 5. In addition, in the embodiment according to FIG. 1, induction furnaces 9 are installed between some of the rolling stands 11 of the finishing train 5 in order to continue maintaining optimum temperature control of the strip.

A strip shear 13 is installed between the casting machine 2 and the holding furnace 6, and another strip shear 14 is positioned downstream of the finishing train 5. A novel feature is that an additional strip shear 12 is positioned downstream of the first induction furnace 7 and upstream of the finishing train 5.

The shear 13 is used to cut the thin slabs 3 during the discontinuous operation, and the shear 14 is used to cut the strips during the continuous rolling operation.

The shear 12 is used to crop the leading end of the strip or the trailing end of the strip during startup or discharge in continuous operation or in discontinuous operation to guarantee reliable conveyance through the downstream active inductive furnaces.

The installation is additionally equipped with elements that are already well known in themselves. These include descaling units 15, which are positioned in locations that are favorable from a process-engineering standpoint. In addition, a cooling line 16 is located downstream of the finishing train 5. Similarly, coilers 17 are installed at the end of the installation.

Figure 2:
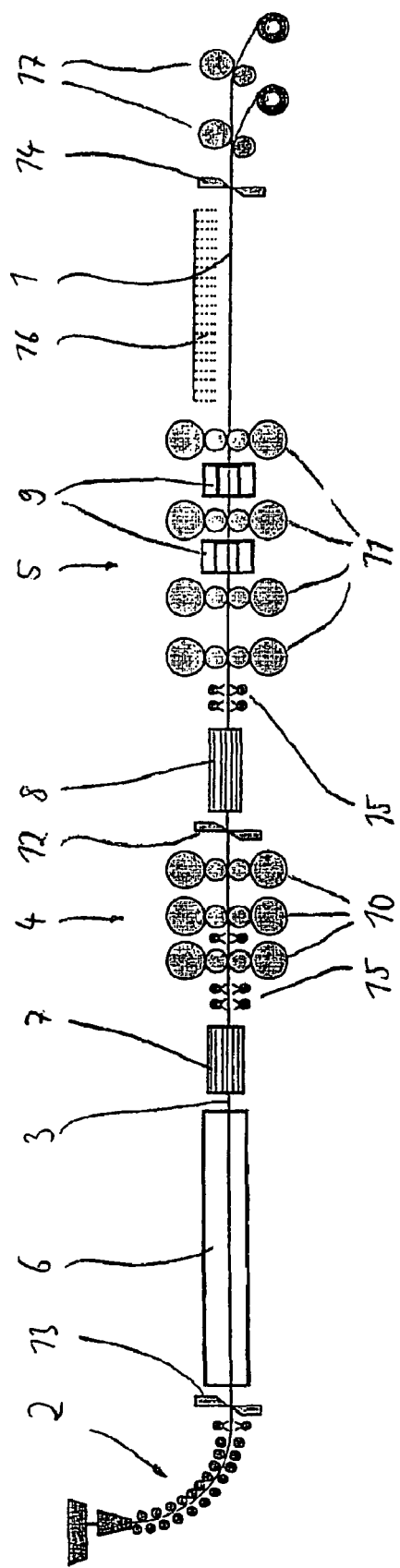
FIG. 2 shows an alternative embodiment of the direct strand reduction installation of the invention in the same view as FIG. 1.

FIG. 2 shows a plant design that includes a roughing train 4 with three rolling stands 10 and a finishing train 5 with four rolling stands 11. Otherwise, the solution shown in FIG. 2 is the same as that of FIG. 1.

Figure 3:
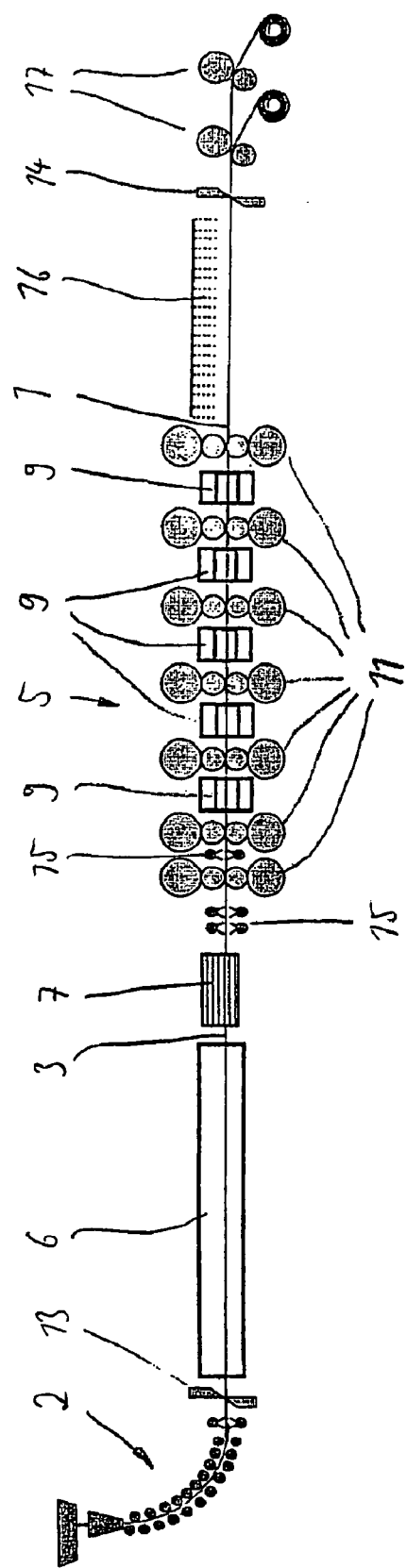
FIG. 3 shows another alternative embodiment of a direct strand reduction installation of the invention in the same view as FIG. 1.

FIG. 3 shows an installation with a compact finishing train, i.e., here there is no roughing train 4 in accordance with the solutions of FIGS. 1 and 2. In the present case, the compact finishing train 5 has seven rolling stands 11, which finish roll the metal strip 1 following the induction furnace 7. Additional inductive heating units 9 are provided between the finishing stands.

The use of the proposed types of installations makes possible a coupled, fully continuous strand reduction process (continuous rolling) and, optionally, decoupled, discontinuous charging of individual slabs (batch rolling).

The furnace 6—preferably realized as a roller hearth furnace—serves as a holding furnace during the discontinuous operation, and it is advantageous for it to be constructed short, so that there is room in it for a thin slab 3. In this way, cooling of the thin slab during conveyance at casting speed is prevented. With the inductive furnace 7, the thin slab 3 is reheated during continuous operation or discontinuous operation. In this regard, the heat input can be individually adjusted as a function of the casting speed, so that when the thin slab 3 leaves the inductive furnace 7, a constant temperature at the desired level is obtained. Another advantage of the inductive furnace 7 compared to a gas-fired furnace is the short overall length with a suitably high heating capacity.

Figure 4:
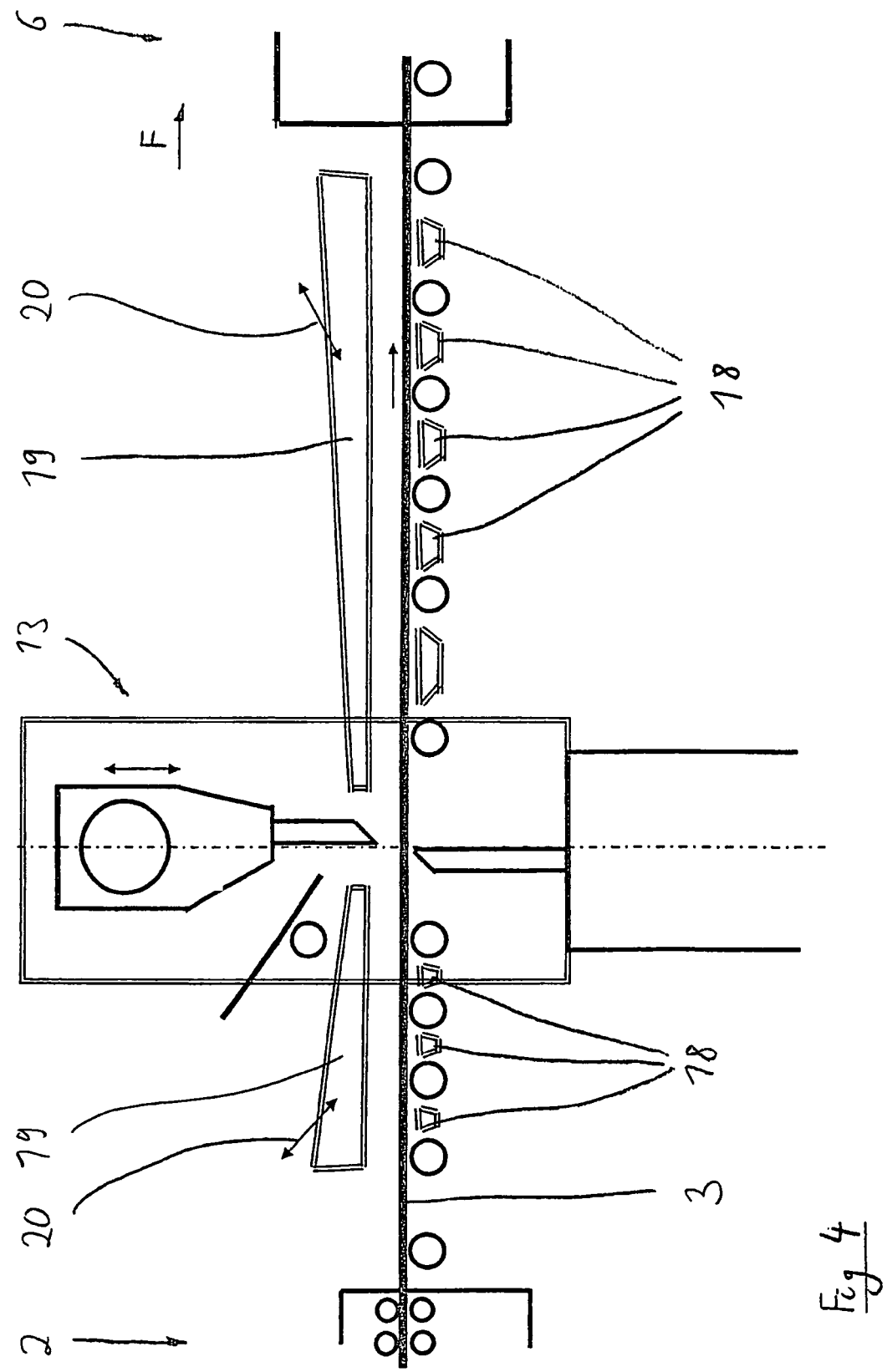
FIG. 4 shows schematically the area between the casting machine and the rolling train with a shear and means for providing thermal insulation.

FIG. 4 shows schematically the area between the casting machine 2 and the rolling train or the holding furnace 6, with a shear 13. Especially during continuous operation, in which rolling is carried out at the low casting speed, it is important to minimize heat losses. To this end, in this embodiment, the roller table is equipped with thermal insulating means 18, 19 between the casting machine 2 and the furnace 6 in the vicinity of the shear 13 (and upstream and downstream of the induction heater). In the present case, these means are designed as thermal insulation boards, which are positioned between the rollers of the roller table and above the rolls of the roller table. The thermal insulating means 18 are stationary.

It is not customary to position thermal insulating means in the area in which sequences of movements occur (e.g., in the vicinity of the shear 13), since a cropping cut is carried out at regular intervals of time. During continuous operation, on the other hand, the shears are inactive for long periods of time, so that provision is made in the present embodiment also to insulate the area of the shear closely alongside and below the slab 3 or strip 1 in order to have a positive influence on the energy balance. In other words, the roller table thermal insulation covering is normally active. Only if it is intended that a cut be made (especially at the start of casting or during batch rolling), are the thermal insulating means 19 moved out, especially swung out, from the insulation region into a holding position by moving means 20 (indicated in FIG. 4 only in a highly schematic way by double arrows).

Temperature loss can be prevented by the thermal insulation explained above.

Figure 5:
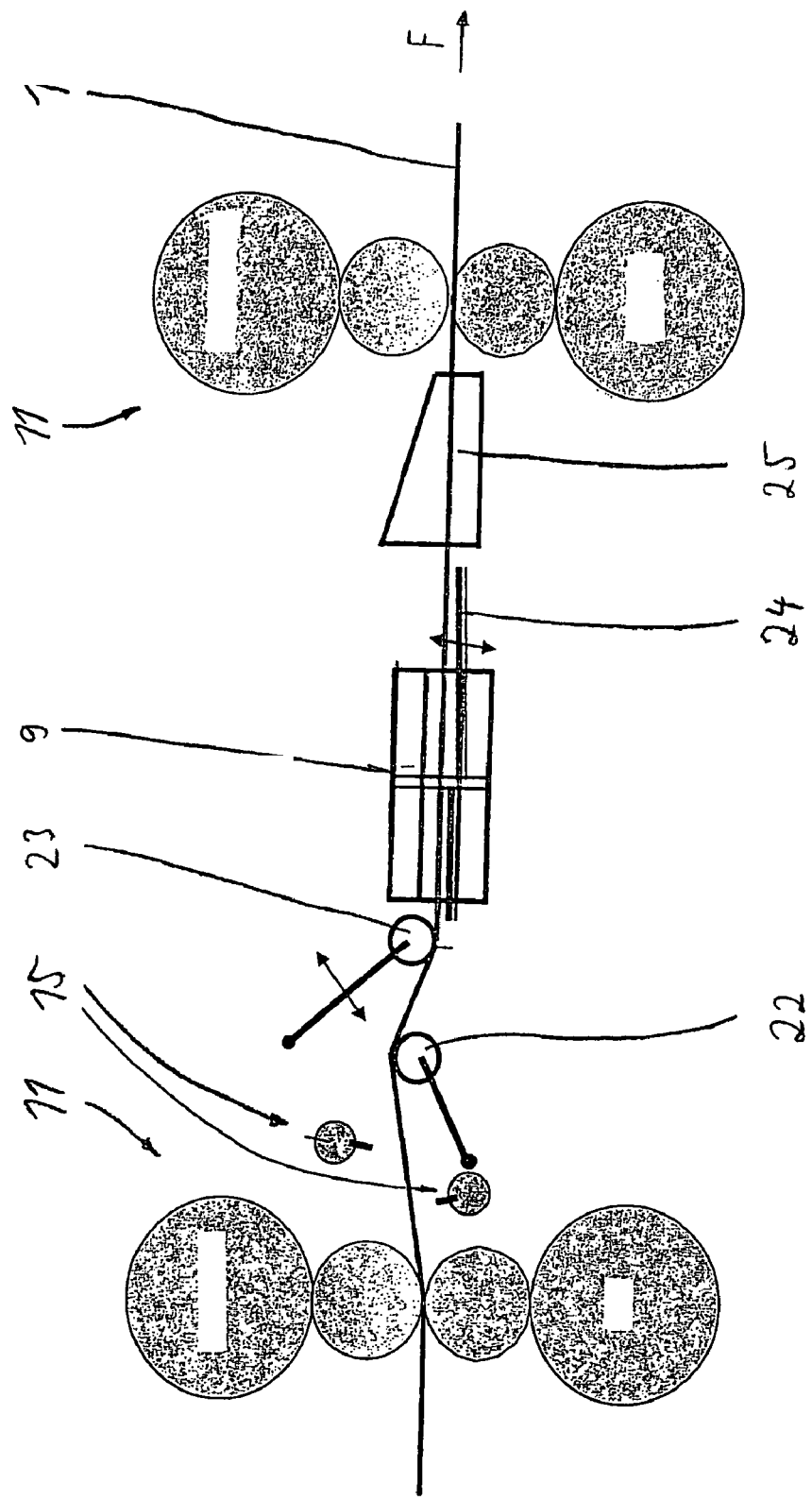
FIG. 5 shows schematically the section of the finishing train with two rolling stands, between which a descaling unit and induction furnace are arranged.

Since the rolling process occurs relatively slowly in the continuous operation, it makes sense to carry out a descaling of the surface of the slab 3 or strip 1 between the forward rolling stands and then to heat the strip. This has a positive effect on the surface quality. An embodiment of this type with respect to the installation of the invention is shown in FIG. 5, which shows the area between two rolling stands 11 of the finishing train 5, where a descaling unit 15 is positioned first in the direction of conveyance F of the strip 1 or slab 3. A looper 22 and a retaining roller 23 keep the strip 1 under tension. The strip 1 enters an induction furnace 9 and then the following rolling stand 11 via a transfer table 24 and a lateral guide 25. The order of the rolling stands, furnaces and descaling units can also be combined in any other desired way.

As explained above, provision can be made for a holding furnace and an induction furnace to be arranged in succession, and, of course, the order can be selected as desired, namely, the induction heater can also be positioned upstream of the holding furnace.

Figure 6:
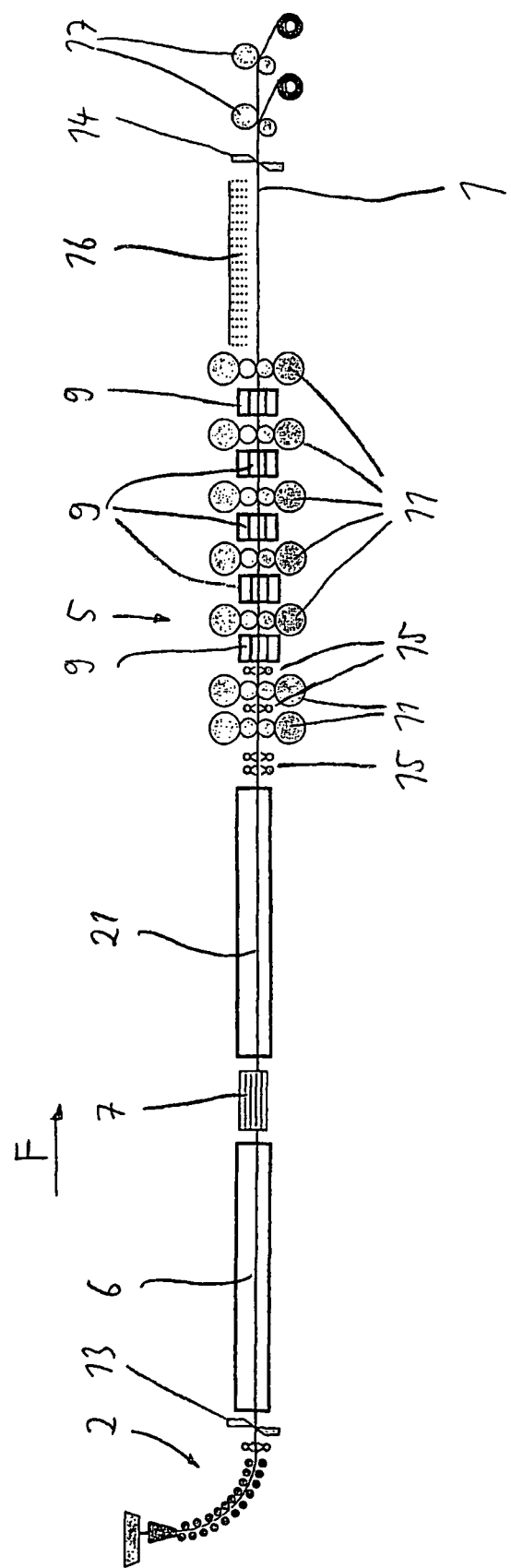
FIG. 6 shows another alternative embodiment of a direct strand reduction installation of the invention in the same view as FIG. 1.

It is also possible to install a soaking furnace 21 downstream of the first furnace in the form of a holding furnace 6 and of an induction furnace 7 that follows the holding furnace 6 in the direction of conveyance F, as is shown in FIG. 6.

This is advantageous especially when an especially high temperature is produced at the entrance to the finishing train, which may be necessary, e.g., for grain-oriented silicon steel. Here the first furnace 6 is a heating furnace, which is assisted by the induction furnace 7. For the purpose of homogenizing the temperature distribution over the width and thickness of the strip, the soaking furnace 21 is advantageous. This furnace configuration is preferred for the process explained here, but it can also be used in a conventional CSP plant, i.e., in batch operation.

In continuous rolling, the level of the casting speed determines the temperature variation through the entire installation. Depending on the casting speed, a computer model dynamically controls the heating power of the inductive furnaces upstream and within the rolling train in such a way that the delivery temperature of the rolling train reaches the target temperature.

If the casting speed falls below a certain preset threshold value (in the event of problems in the casting installation, in the case of materials that are difficult to cast, during the startup process, etc.), the operation is automatically switched from continuous mode to discontinuous mode.

This means that the thin slab 3 is cut with the shear 13, and the rolling speed is increased in such a way that the desired final rolling temperature is reached. In this regard, the slab segments and strip segments within the train 4, 5 are monitored, and the conveyance speed or rolling speed and the inductive heating power of the inductive furnaces over the length of the strip are dynamically adapted as a function of the temperature distribution.

If the casting process has stabilized again, and the casting speed rises above the preset minimum value, then the operation is automatically switched back from discontinuous mode to continuous mode.

During the continuous rolling, the inductive furnaces 8 are usually positioned within the finishing train 5, and during the discontinuous operation or during the startup process at the leading end of the strip, they are in a safe holding position well above or well to the side of the strip.

The ability to switch or adjust to continuous operation or discontinuous operation results in a high degree of flexibility, which represents an increase in process reliability. This is especially true when a production plant is being started up.

The continuous mode of operation is not generally used during processing; the batch operation is used primarily when there are casting speed problems or during the startup operation.

For the purpose of energy optimization, it can be provided that mainly relatively thin strip or strip that is difficult to produce is rolled in the continuous mode of operation, while strip with a thickness greater than a critical thickness is rolled in the batch operation at a high speed and thus a low heating energy requirement. The correct combination of type of production optimizes the energy balance of the CSP continuous/batch installation for the entire product mix.

LIST OF REFERENCE SYMBOLS 1 metal strip
2 casting machine
3 thin slab
4,5 rolling train
4 roughing train
5 finishing train
6 holding furnace (roller hearth furnace)
7 induction furnace
8 induction furnace
9 induction furnace
10 rolling stand of the roughing train
11 rolling stand of the finishing train
12 strip shear
13 strip shear
14 strip shear
15 descaling unit
16 cooling line
17 coiler
18 thermal insulating means
19 thermal insulating means
20 moving means
21 soaking furnace
22 looper
23 retaining roller
24 transfer table
25 lateral guide
F direction of strip conveyance

The invention claimed is:

1. A method for producing metal strip (1) by direct strand reduction, in which a thin slab (3) is first cast in a casting machine (2) and then rolled in at least one rolling train (4, 5) with utilization of primary heat of a casting process, wherein the cast thin slab (3) passes through at least one holding furnace (6) and directly after the holding furnace through an induction furnace (7, 8, 9), between the casting machine (2) and the at least one rolling train (4, 5) or within the rolling train (5), where the holding furnace (6) and the induction furnace (7, 8, 9) are activated or deactivated and controlled by open-loop or closed-loop control as a function of a selected mode of operation, namely, a first mode of operation of continuous production of the metal strip (1) and a second mode of operation of discontinuous production of the metal strip (1), wherein a first shear (13) is arranged behind the casting machine (2) for cutting thin slabs (3) during the second, discontinuous mode of operation, and a further shear (14) is arranged ahead of a coiler for cutting the strip during the first, continuous mode of operation, wherein the selection of the mode of operation is made as a function of at least one of the following: the final thickness of the metal strip (1) to be produced; the casting speed of the thin slab (3); and a thickness of a product to be produced and the speed of the metal strip (1) or thin slab (3).

2. A method in accordance with claim 1, wherein, when the mode of operation of discontinuous production of the metal strip (1) is selected, the thin slab (3) is held batchwise in the holding furnace (6) at a desired temperature before being conveyed into the rolling train (4, 5).

3. A method in accordance with claim 1, wherein, when the mode of operation of continuous production of the metal strip (1) is selected, the thin slab (3) is brought to a desired temperature in the holding furnace (6) and then heated by the one or more induction furnaces (7, 8, 9) to the desired rolling temperature immediately before the rolling operation in the rolling train (4, 5).

4. A method in accordance with claim 3, wherein the amount of heat introduced into the thin slab (3) by the one or more induction furnaces (7, 8, 9) depends on the casting speed and the discharge temperature from the casting machine (2) or holding furnace (6).

5. A method in accordance with claim 1, wherein the loss of heat from the heated metal strip (1) and/or from the heated thin slab (3) to the environment is hindered by thermal insulating means (18, 19).

6. A method in accordance with claim 5, wherein at least some of the thermal insulating means (18, 19) are moved into or out of the vicinity of the metal strip (1) and/or the thin slab (3) as a function of the desired mode of operation of the direct strand reduction installation.

7. A method in accordance with claim 1, wherein the metal strip (1) and/or the thin slab (3) is descaled in the rolling train (4, 5) in an upstream section of the rolling train (4, 5) with respect to the direction of strip conveyance (F) and is then heated in a section of the rolling train (4, 5) that is farther downstream with respect to the direction of strip conveyance (F).

8. A method in accordance with claim 7, wherein the descaling of the metal strip (1) and/or the thin slab (3) by means of a descaling unit (15) and the heating of the metal strip (1) and/or the thin slab (3) by means of an induction furnace (8, 9) take place between two rolling stands (10, 11).

9. A method in accordance with claim 8, wherein the heating follows the descaling in the direction of strip conveyance (F).

10. A method in accordance with claim 8, wherein the descaling follows the heating in the direction of strip conveyance (F).

11. An installation for producing a metal strip (1) by direct strand reduction, which comprises a casting machine (2), in which a thin slab (3) is first cast, and at least one rolling train (4, 5), which is located downstream of the casting machine (2) and in which the thin slab (3) is rolled with utilization of primary heat of a casting process, wherein at least one holding furnace (6) and an induction furnace (7, 8, 9) is installed between the casting machine (2) and the at least one rolling train (4, 5) or within the rolling train (5), where control means are present with which the holding furnace (6) and/or the induction furnace (7, 8, 9) is activated or deactivated and controlled by open-loop or closed-loop control as a function of a selected mode of operation, namely, a first mode of operation of continuous production of the metal strip (1) and a second mode of operation of discontinuous production of the metal strip (1), wherein the control means are operative so that the induction furnace (7, 8, 9) is activated or deactivated and controlled by open-loop or closed-loop control as a function of a selected mode of operation, wherein a first shear (13) is arranged behind the casting machine (2) for cutting thin slabs (3) during the second, discontinuous mode of operation, and a further shear (14) is arranged ahead of a coiler for cutting the strip during the first, continuous mode of operation, wherein the selection of the mode of operation is made as a function of at least one of the following: the final thickness of the metal strip (1) to be produced; the casting speed of the thin slab (3); and a thickness of roduct to be roduced and the speed of the metal strip (1) or thin slab (3).

12. An installation in accordance with claim 11, wherein, in the direction of conveyance (F) of the thin slab (3) and the metal strip (1), a holding furnace (6) is installed first and then an induction furnace (7).

13. An installation in accordance with claim 11, wherein, in the direction of conveyance (F) of the thin slab (3) and the metal strip (1), an induction furnace (7) is installed first and then a holding furnace (6).

14. An installation in accordance with claim 11, wherein at least one additional induction furnace (9) is installed between two rolling stands (10, 11) of the roughing train (4) and/or the finishing train (5).

15. An installation in accordance with claim 11, wherein a strip shear (12) is installed downstream of the first induction furnace (7) and upstream of the finishing train (5) in the direction of conveyance of the thin slab (3) or metal strip (1).

16. An installation in accordance with claim 11, wherein a strip shear (13), which is used chiefly during the discontinuous rolling operation, is installed downstream of the casting machine (2) and upstream of the holding furnace (6) in the direction of conveyance of the thin slab (3) and the metal strip (1).

17. An installation in accordance with claim 11, wherein a strip shear (14), which is used for cutting the metal strip during the continuous mode of operation, is installed downstream of the finishing train (5) in the direction of conveyance of the thin slab (3) and the metal strip (1).

18. An installation in accordance with claim 11, wherein thermal insulating means (18, 19) for hindering the loss of heat from the heated metal strip (1) and/or from the thin slab (3) to the environment are present, which are arranged in the vicinity of the metal strip (1) at least some of the time.

19. An installation in accordance with claim 18, wherein moving means (20) are present for moving at least some of the thermal insulating means (18, 19) into or out of the vicinity of the metal strip (1) and/or the thin slab (3).

20. An installation in accordance with claim 11, wherein at least one descaling unit (15) is present, which is installed in an upstream section of the rolling train (4, 5) in the direction of strip conveyance (F).

21. An installation in accordance with claim 11, wherein a holding furnace (6), an induction furnace (7), and a soaking furnace (21) are installed in this order upstream of the rolling train (4, 5) in the direction of conveyance (F) of the thin slab (3) or metal strip (1).

22. A method for producing metal strip (1) by direct strand reduction, in which a thin slab (3) is first cast in a casting machine (2) and then rolled in at least one rolling train (4, 5) with utilization of primary heat of a casting process, wherein the cast thin slab (3) passes through at least one holding furnace (6) and directly after the holding furnace through an induction furnace (7), between the casting machine (2) and the at least one roiling train (4, 5) or within the rolling train (5), where the holding furnace (6) and the induction furnace (7, 8, 9) are activated or deactivated and controlled by open-loop or closed-loop control as a function of a selected mode of operation, namely, a first mode of operation of continuous production of the metal strip (1) and a second mode of operation of discontinuous production of the metal strip (1), wherein a first shear (13) is arranged behind the casting machine (2) for cutting thin slabs (3) during the second, discontinuous mode of operation, and a further shear (14) is arranged ahead of a coiler for cutting the strip during the first, continuous mode of operation, the method further including selecting the first, continuous production mode or the second, discontinuous production mode based on at least one boundary characteristic selected from the group consisting of: final thickness; material; final rolling temperature; casting speed; and a product of casting speed and casting thickness.

23. A method for producing metal strip (1) by direct strand reduction, in which a thin slab (3) is first cast in a casting machine (2) and then rolled in at least one rolling train (4, 5) with utilization of primary heat of a casting process, wherein the cast thin slab (3) passes through at least one holding furnace (6) and directly after the holding furnace through an induction furnace (7, 8, 9), between the casting machine (2) and the at least one rolling train (4, 5) or within the rolling train (5), where the holding furnace (6) and the induction furnace (7, 8, 9) are activated or deactivated and controlled by open-loop or closed-loop control as a function of a selected mode of operation, namely, a first mode of operation of continuous production of the metal strip (1) and a second mode of operation of discontinuous production of the metal strip (1), wherein a first shear (13) is arranged behind the casting machine (2) for cutting thin slabs (3) during the second, discontinuous mode of operation, and a further shear (14) is arranged ahead of a coiler for cutting the strip during the first, continuous mode of operation, the method further including selecting the first, continuous production mode for high casting speeds and/or thin end thicknesses, and selecting the second, discontinuous mode of production when final rolling temperature cannot be securely maintained due to low casting speeds or to save energy or due to additional temperature loss.

* * * * *

UNITED STATES PATENT AND TRADEMARK OFFICE
CERTIFICATE OF CORRECTION

PATENT NO. : 8,365,806 B2  
APPLICATION NO. : 12/086525  
DATED : February 5, 2013  
INVENTOR(S) : Rosenthal et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 160 days.

Signed and Sealed this
First Day of September, 2015

Michelle K. Lee
*Director of the United States Patent and Trademark Office*